(12) United States Patent
Kim et al.

(10) Patent No.: US 10,503,355 B2
(45) Date of Patent: Dec. 10, 2019

(54) UI MANAGEMENT SERVER AND METHOD OF CONTROLLING THE SAME

(71) Applicants: Hyundai Motor Company, Seoul (KR); Kia Motors Corporation, Seoul (KR)

(72) Inventors: Joon Young Kim, Seoul (KR); Jeong Won Lee, Suwon-si (KR)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 0 days.

(21) Appl. No.: 15/966,528

(22) Filed: Apr. 30, 2018

(65) Prior Publication Data
US 2019/0138184 A1 May 9, 2019

(30) Foreign Application Priority Data
Nov. 3, 2017 (KR) .......................... 10-2017-0145933

(51) Int. Cl.
*G06F 3/0481* (2013.01)
*G06F 3/041* (2006.01)
(Continued)

(52) U.S. Cl.
CPC .......... *G06F 3/04817* (2013.01); *B60K 35/00* (2013.01); *B60K 37/06* (2013.01); *G06F 3/0416* (2013.01); *G06F 3/04842* (2013.01); *G06F 3/04886* (2013.01); *B60K 2370/11* (2019.05); *B60K 2370/122* (2019.05); *B60K 2370/56* (2019.05); *B60K 2370/5899* (2019.05); *B60K 2370/592* (2019.05); *G06F 9/451* (2018.02);
(Continued)

(58) Field of Classification Search
CPC .................................. G06F 3/048; G06F 3/14
See application file for complete search history.

(56) References Cited

U.S. PATENT DOCUMENTS

2002/0130906 A1* 9/2002 Miyaki .............. G01C 21/3664
715/837
2002/0191026 A1 12/2002 Rodden et al.
(Continued)

FOREIGN PATENT DOCUMENTS

JP          05020016 A     1/1993
JP        2008090454 A     4/2008
(Continued)

*Primary Examiner* — Li P Sun
*Assistant Examiner* — Qi Wan
(74) *Attorney, Agent, or Firm* — Slater Matsil, LLP

(57) ABSTRACT

A UI management server and a method of controlling the same are disclosed. The method of controlling the UI management server includes receiving registration information of an Internet of Things (IoT) device from an IoT management server for collecting information regarding the IoT device, classifying the IoT device into at least one group using the registration information, determining different button icons matching the IoT device according to property information of the group, calculating size information and arrangement information of the button icons according to the number of the button icons or frequency of use of each of the button icons, and transmitting the button icons, the size information, and the arrangement information to a designated vehicle.

17 Claims, 5 Drawing Sheets

(51) Int. Cl.

| | | |
|---|---|---|
| *H04W 4/70* | (2018.01) | |
| *G06F 3/0484* | (2013.01) | |
| *G06F 3/0488* | (2013.01) | |
| *B60K 35/00* | (2006.01) | |
| *B60K 37/06* | (2006.01) | |
| *G06F 9/451* | (2018.01) | |
| *H04L 29/08* | (2006.01) | |
| *H04W 4/40* | (2018.01) | |

(52) U.S. Cl.
CPC .............. *H04L 67/12* (2013.01); *H04W 4/40* (2018.02); *H04W 4/70* (2018.02)

(56) References Cited

U.S. PATENT DOCUMENTS

| | | | | | |
|---|---|---|---|---|---|
| 2005/0223335 | A1* | 10/2005 | Ichikawa | .............. | G06F 3/0481 715/801 |
| 2006/0031457 | A1* | 2/2006 | Motoyama | .......... | H04L 12/2803 709/224 |
| 2010/0005065 | A1 | 1/2010 | Lai | | |
| 2010/0027883 | A1* | 2/2010 | Thomas | .................... | G06T 9/00 382/166 |
| 2011/0037720 | A1* | 2/2011 | Hirukawa | ............. | G06F 3/0488 345/173 |
| 2012/0092251 | A1* | 4/2012 | Hashimoto | ............ | B60K 35/00 345/156 |
| 2013/0086644 | A1* | 4/2013 | Bahn | .................. | H04L 12/2818 726/4 |
| 2013/0152001 | A1* | 6/2013 | Lovitt | ................... | G06F 3/0482 715/765 |
| 2014/0108943 | A1* | 4/2014 | Lee | ..................... | G06F 3/04817 715/738 |
| 2014/0232273 | A1* | 8/2014 | Sasaki | ................. | G06F 3/04817 315/131 |
| 2014/0325374 | A1* | 10/2014 | Dabrowski | ............. | G06F 9/451 715/744 |
| 2015/0169141 | A1* | 6/2015 | Kim | ..................... | G06F 3/0482 715/769 |
| 2017/0182416 | A1* | 6/2017 | Lee | ......................... | A63F 13/20 |
| 2018/0165891 | A1* | 6/2018 | Kim | ....................... | B60R 16/02 |

FOREIGN PATENT DOCUMENTS

| | | |
|---|---|---|
| JP | 2008299407 A | 12/2008 |
| JP | 2011232913 A | 11/2011 |

\* cited by examiner

<Number of touches>      <Before feedback>      <After feedback>
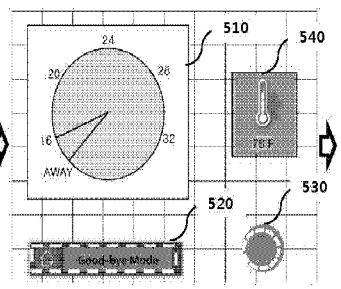 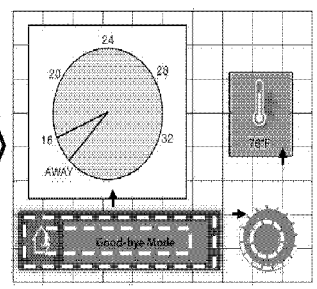
FIG. 5A         FIG. 5B         FIG. 5C

UI MANAGEMENT SERVER AND METHOD OF CONTROLLING THE SAME

CROSS-REFERENCE TO RELATED APPLICATIONS

This application claims priority to Korean Patent Application No. 10-2017-0145933, filed on Nov. 3, 2017, which application is hereby incorporated herein by reference.

TECHNICAL FIELD

The present invention relates to a user interface (UI) management server.

BACKGROUND

Recently, vehicles equipped with telematics, which is wireless communication technology used for vehicles, have increasingly been supplied. Telematics enable a vehicle to perform autonomous driving and a safety function, using wireless communication technology and sensors installed in the vehicle. Telematics may provide a service for controlling the vehicle using wireless communication and may mainly be used together with a vehicle security device, a vehicle warning sound generation device, a vehicle remote control device, and the like. Telematics may be implemented by long-distance wireless communication between a telematics device mounted in the vehicle and a telematics server outside the vehicle.

The Internet has evolved from a human-centered connection network in which human beings generate and consume information into an Internet of Things (IoT) network in which distributed components such as things exchange information with each other to process the information. IoT encompasses the concept of performing communication by connecting all things that can perform communication to a network. All things capable of being systematically recognized, that is, IoT devices, may have short-range and long-range communication functions and produce data through a sensor, etc.

IoT may be implemented by an IoT network between a variety of types of IoT devices and an IoT management server for managing the IoT devices. A user may access the IoT network between the IoT devices and the IoT management server through a mobile terminal to acquire status information about the IoT devices and directly or indirectly control the IoT devices.

A vehicle includes an infotainment device. Like a mobile terminal capable of accessing the IoT network, the infotainment device of the vehicle may also access the IoT network in association with a telematics server. When the vehicle accesses the IoT network, since the user may be in a state in which special attention to a traveling state should be paid, it is necessary to provide a user interface (UI) having higher visibility and controllability. It is also necessary to provide a UI having easier accessibility in consideration of user feedback. Accordingly, a detailed method for managing a UI used when the vehicle accesses the IoT network is needed.

SUMMARY

The present invention relates to a user interface (UI) management server and, in particular embodiments, to a UI management server for providing UI related information to a vehicle through wireless communication and a method of controlling the same. Embodiments of the present invention are directed to a UI management server and a method that can substantially obviate one or more problems due to limitations and disadvantages of the related art.

Embodiments the present invention to provide a server for managing a UI capable of controlling an IoT device which operates outside a vehicle, through telematics technology.

Embodiments and advantages of the present invention are not limited to what has been particularly described hereinabove and other technical advantages not described herein will be more clearly understood by persons skilled in the art from the following detailed description.

In accordance with one embodiment of the invention, as embodied and broadly described herein, a method of controlling a user interface (UI) management server includes receiving registration information of an Internet of Things (IoT) device from an IoT management server for collecting information regarding the IoT device. The IoT device is classified into at least one group using the registration information. Different button icons matching the IoT device are determined according to property information of the group. Size information and arrangement information of the button icons are calculated according to the number of the button icons or frequency of use of each of the button icons. The button icons, the size information, and the arrangement information to are transmitted to a designated vehicle.

The button icons may include a control input indication and an operation mode of the IoT device.

The method may further include receiving the number of touches of each of the button icons from the vehicle, changing the size information or the arrangement information using the number of touches, and transmitting the changed size information or the changed arrangement information to the vehicle.

The method may further include transmitting an output mode determined according to the number of button icons transmitted to the vehicle, wherein the output mode includes a first mode indicating display of the button icons and a second mode indicating display of a name of the IoT device as text.

The determining the button icons may include determining button icons including a control input indication or an operation mode, for receiving different operation modes of the IoT device according to the group.

The transmitting the button icons, the size information, and the arrangement information to the designated vehicle may include splitting a background screen on which the button icons are located into regions in consideration of the number of the button icons, determining a focus of each of the split regions of the background screen, and determining an interval of adjacent button icons using a distance between focuses of the adjacent button icons and sizes of the button icons.

The determining the focus may include determining the focus in consideration of initial set size information of the button icons.

The determining the interval of the adjacent button icons may include increasing a size of each of the adjacent button icons by a first ratio.

The method may further include increasing sizes of the button icons by a second ratio when the number of touches of each of the button icons is above a threshold value during a preset time.

In another aspect of the present invention, there is provided a computer-readable recording medium in which a program for performing the above-described method is recorded.

In another aspect of the present invention, a user interface (UI) management server includes a communication unit configured to receive registration information of an Internet of Things (IoT) device from an IoT management server for collecting information regarding the IoT device. A controller is configured to classify the IoT device into at least one group using the registration information and to determine different button icons matching the IoT device according to property information of the group. The controller is configured to calculate size information and arrangement information of the button icons according to the number of the button icons or frequency of use of each of the button icons and and to transmit the button icons, the size information, and the arrangement information to a designated vehicle.

The button icons may include a control input indication and an operation mode of the IoT device.

If the communication unit receives the number of touches of each of the button icons from the vehicle, the controller may change the size information or the arrangement information using the number of touches and transmit the changed size information or the changed arrangement information to the vehicle.

The communication unit may transmit an output mode determined according to the number of button icons transmitted to the vehicle, and the output mode may include a first mode indicating display of the button icons and a second mode indicating display of a name of the IoT device as text.

The controller may determine button icons including a control input indication or an operation mode, for receiving different operation modes of the IoT device according to the group.

The controller may split a background screen on which the button icons are located into regions in consideration of the number of the button icons, determine a focus of each of the split regions of the background screen, and determine an interval of adjacent button icons using a distance between focuses of the adjacent button icons and sizes of the button icons.

The controller may determine the focus in consideration of initial set size information of the button icons.

The controller may increase a size of each of the adjacent button icons by a first ratio. The controller may increase sizes of the button icons by a second ratio when the number of touches of each of the button icons is above a threshold value during a preset time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment s of the invention and together with the description serve to explain the principle of the invention. In the drawings:

FIG. 5, which includes FIGS. 5A-5C, is a view illustrating a method in which a UI management server changes the sizes and arrangements of button icons in consideration of user feedback according to an embodiment of the present invention.

DETAILED DESCRIPTION OF ILLUSTRATIVE EMBODIMENTS

Figure 1:
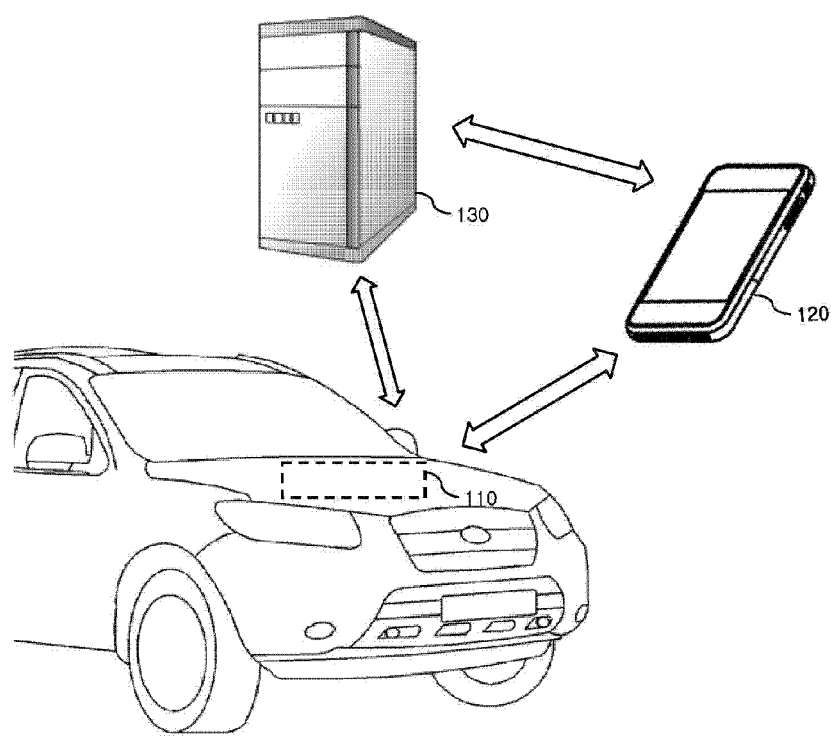
FIG. 1 is a view illustrating a system for performing a method of controlling a UI management server using telematics according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Reference will now be made in detail to the embodiments of the present invention, examples of which are illustrated in the accompanying drawings. The suffixes "module" and "unit" used in the description below are given or used together only in consideration of ease in preparation of the specification and do not have distinctive meanings or functions.

Although all elements constituting the embodiments of the present invention are described as being integrated into a single one or operated as a single one, the present invention is not necessarily limited to such embodiments. According to embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present invention pertains. The computer program may be stored in computer readable media such that the computer program is read and executed by a computer to implement embodiments of the present invention. Computer program storage media may include magnetic recording media, optical recording media, and carrier wave media.

In describing embodiments, when an element is referred to as being "on (over)" or "under (below)", "before (in front of)", or "after (behind)", this includes the meaning that two elements directly contact each other or one or more other elements are disposed between two elements.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless obviously defined in the present invention, such terms are not interpreted as having ideal or excessively formal meanings.

Additionally, in describing the components of the present disclosure, terms like first, second, A, B, (a), and (b) are used. These are solely for the purpose of differentiating one component from another, and one of ordinary skill would understand that the terms do not imply or suggest the substance, order or sequence of the components. If a component is described as "connected", "coupled", or "linked" to another component, one of ordinary skill in the art would understand that the components are not necessarily directly "connected", "coupled", or "linked" but also are indirectly "connected", "coupled", or "linked" via a third component.

In addition, in the following description of the embodiments disclosed herein, a detailed description of related known technologies will be omitted when it may make the subject matter of the embodiments disclosed herein rather unclear.

FIG. 1 is a view illustrating a system for performing a method of controlling a UI management server using telematics according to an embodiment of the present invention.

Referring to FIG. 1, a telematics device no mounted in a vehicle may be connected to a telematics server 130 using wireless communication technology and may be connected to a mobile terminal 120 using wireless communication technology or near field communication technology.

The telematics device no may request that the telematics server 130 transmit information demanded by an infotainment device mounted in the vehicle in cooperation with the infotainment device. The telematics device no may output information received from the telematics server 130 through the infotainment device so that the information may be provided to a user.

In some embodiments, the telematics device 110 may request a UI management server via the telematics server 130 to provide information about a UI provided to the user or may directly request that the telematics server 130 provide the information about the UI. Upon making a request for the information about the UI, the telematics device no may transmit specification information about an input and output device of the vehicle. When the UI is provided through the input and output device, the UI may depend on the hardware specifications of the input and output device. In some embodiments, the input and output device may include a touchscreen. The vehicle may transmit information about the size of a display device included in the touchscreen.

The infotainment device (e.g., an audio video navigation (AVN) device) may include a display device for displaying information received from the telematics server 130. According to an embodiment, the display device may be a touchscreen through which a control signal of an IoT device may be received from the user.

The telematics device no may transmit and receive status information through vehicle communication to and from various electric control units (ECUs) installed in the vehicle and may transmit the received status information of the vehicle to the telematics server 130. On the contrary, the telematics server 130 may transmit a signal for controlling the ECUs installed in the vehicle through the telematics device no.

In some embodiments, upon transmitting specification information of the display device, the telematics device no may transmit the information about the UI provided to the user through the display device to the telematics server 130 or to the UI management server through the telematics server 130. On the contrary, the telematics server 130 may transmit UI configuration information to the telematics device no as the information about the UI. After receiving the UI configuration information, the vehicle may provide a UI to which the UI configuration information is applied to the user.

The telematics server 130 is a network device operating to support telematics technology implemented in the vehicle and may store unique information of the vehicle, operation information of the vehicle, and the like. The telematics server 130 may be in cooperation with the vehicle through a wireless communication network during traveling of the vehicle or before/after traveling of the vehicle. The telematics server 130 may store information set by the user and aid in traveling of the vehicle and manipulation of a device/function of the vehicle related to safety.

According to an embodiment, the telematics server 130 may transmit and receive a signal and information to and from the UI management server through wired or wireless communication. According to another embodiment, the telematics server 130 may include the UI management server. The telematics server 130 may receive information about the mobile terminal 120 and the vehicle from an external server. In some embodiments, the external server may be the UI management server.

The UI management server may transmit the information about the UI provided to the user to the telematics device no mounted in the vehicle. Upon receiving the information about the UI, the vehicle may display the UI using the UI configuration information included in the information about the UI.

The mobile terminal 120 is a terminal carried by the user when the user rides in the vehicle. In some embodiments, the mobile terminal 120 may include a mobile phone, a smartphone, a laptop computer, a digital broadcast terminal, a personal digital assistant (PDA), a portable multimedia player (PMP), an MP3 player, and a wearable device such as a smartwatch. However, the mobile terminal 120 is not limited to the above-described devices and the mobile terminal 120 according to the present invention may be any device which can communicate with the telematics device no and the telematics server 130.

The mobile terminal 120 may transmit and receive a signal and information to and from the vehicle through wireless communication technology and near-field communication technology. The mobile terminal 120 may be in cooperation with the telematics server 130 through long-range wireless communication technology and may transmit a control signal to the vehicle via the telematics server 130.

Each of the telematics device 110 and the mobile terminal 120 may perform long-range wireless communication with the telematics server 130 through a communication base station. The communication base station may serve to relay communication between the mobile terminal 120 and the telematics server 130 and between the telematics device 110 and the telematics server 130. The communication base station functions to establish a communication channel of a signal transmitted and received for a relay role and monitor the communication channel.

Figure 2:
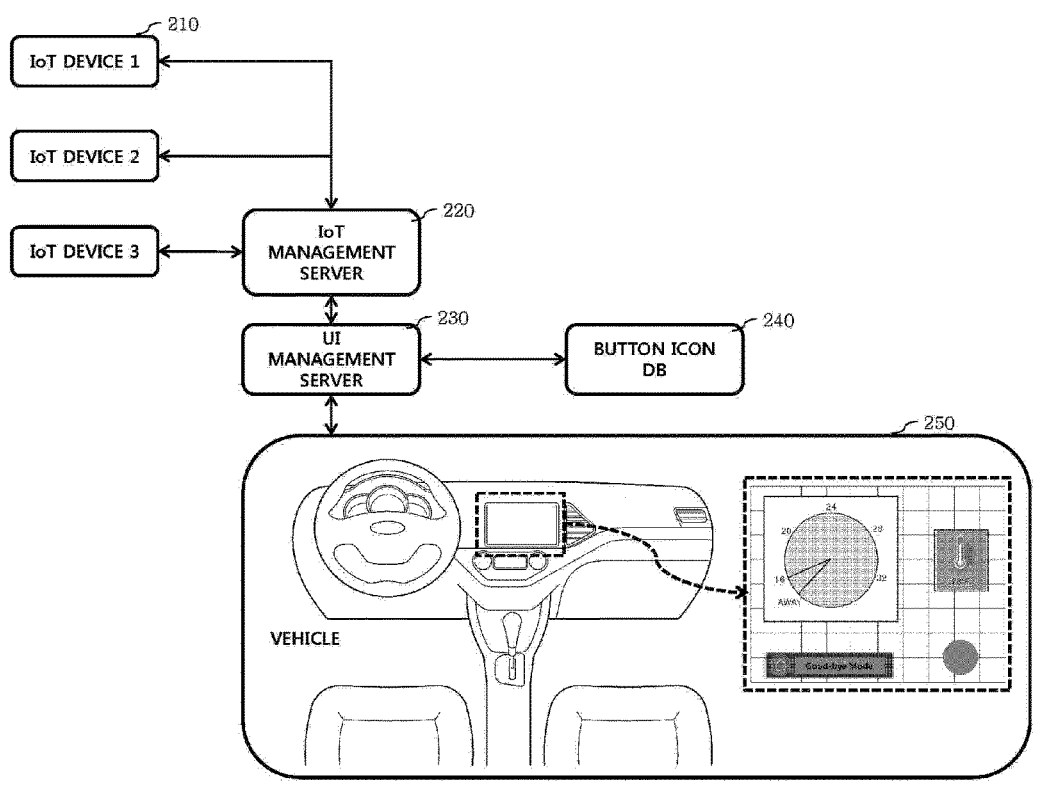
FIG. 2 is a diagram illustrating a UI management server included in an IoT network according to an embodiment of the present invention.

FIG. 2 is a diagram illustrating a UI management server included in an IoT network according to an embodiment of the present invention.

Referring to FIG. 2, the IoT network may include at least one IoT device 210, an IoT management server 220 for directly controlling and managing the IoT device 210, a UI management server 230 for receiving information regarding the IoT device 210 collected from the IoT management server 220 and managing a UI which is a control input means of the IoT device 210, a button icon database (DB) 240 in which button icons displayed on the UI provided by a vehicle 250 to a user are stored, and the vehicle 250 for receiving UI configuration information from the UI management server 230 and outputting the UI according to the received UI configuration information.

The IoT device 210 may include, for example, an illumination device, a heating, ventilation, and air conditioning (HVAC) device, a smart home appliance (e.g., a television, a washing machine, or a microwave oven), a security device (e.g., a door lock), fire extinguishing equipment, an exercise device (e.g., a treadmill or an indoor bicycle), and a medical device (e.g., a massage chair). The IoT device 210 may be connected to the IoT management server 220 through wireless communication.

The IoT device 210 may include identification (ID) information distinguished from other devices, such as a class, a model name, a media access control (MAC) address, or an Internet protocol (IP) address. The ID information and other unique information of the IoT device 210 are a part of information of the IoT device 210 maintained by the IoT device 210. For example, the IoT device 210 may have a name or an additional name thereof specified by a device manufacturer, which is a common comprehensive name.

According to the ID information of the IoT device 210, the IoT device 210 may be classified into at least one group. The ID information of the IoT device no may include group information which is divided according to functions of the IoT device 210. For example, an illumination device for an entryway and an illumination device for a living room may include the illumination device as partial common ID information.

The IoT management server 220 may be connected to the UI management server 230 by exchanging a signal with the at least one IoT device 110. The IoT management server 220 may be connected to the UI management server 230 through wired or wireless communication. As a result, the IoT management server 220 may serve as an IoT gateway capable of connecting the IoT device no to the UI management server 230.

As an embodiment, the IoT management server 220 may support various wireless interfaces (Wi-Fi of 2.4 GHz or 5 GHz, 3G/GPRS, Bluetooth, and XBee) and use MQ telemetry transport (MQTT) which is an IoT standard messaging protocol.

The IoT management server 220 may discover, identify, and authenticate the IoT device 210. The IoT management server 220 may serve as an access point (AP) capable of connecting the IoT device 210 to the UI management server 230 through wireless local area network (LAN) communication.

According to an embodiment, upon discovering the new IoT device 210, the IoT management server 220 may transmit information regarding the new IoT device 210 to the UI management server 230. The information regarding the IoT device 210 may be registration information including ID information or a model name of the IoT device 210 demanded during authentication and registration to the IoT management server 230.

The UI management server 230 may perform overall management of an IoT network between the IoT management server 220 and the vehicle 250 which provides a UI for the IoT device 210.

The UI management server 230 may provide UI configuration information for controlling the IoT device 210 to the vehicle 250. The vehicle 250 may output a UI provided to a user through an input and output device according to the UI configuration information.

The UI management server 230 may classify the IoT device 210 into at least one group using the registration information transmitted by the IoT management server 220. At least one group may be classified according to functions of the IoT device 220.

The UI management server 230 may be connected to the button icon DB 240 for storing information related to the UI provided to the vehicle 250 and may perform analysis using big data of the DB.

The UI management server 230 may determine a button icon matching the IoT device 210 classified as any group and use characteristic information of groups.

In some embodiments, the characteristic information of groups may be information classified according to the functions of the IoT device 210. For example, groups may be classified into an illuminance device group, a smart home appliance group, and the like.

The vehicle 250 may include an IoT application capable of providing the UI so that the user may control the IoT device 210 through an infotainment device. The vehicle 250 may include a telematics device capable of performing wireless communication with the UI management server 240 and receive signals and various types of information through the telematics device.

The vehicle 250 may provide the UI for causing the user to directly control the IoT device 110. In some embodiments, the UI may be provided through a display device of the infotainment device mounted in the vehicle 250. If the display device is comprised of a touchscreen, the UI may function as an input means from the user.

Figure 3:
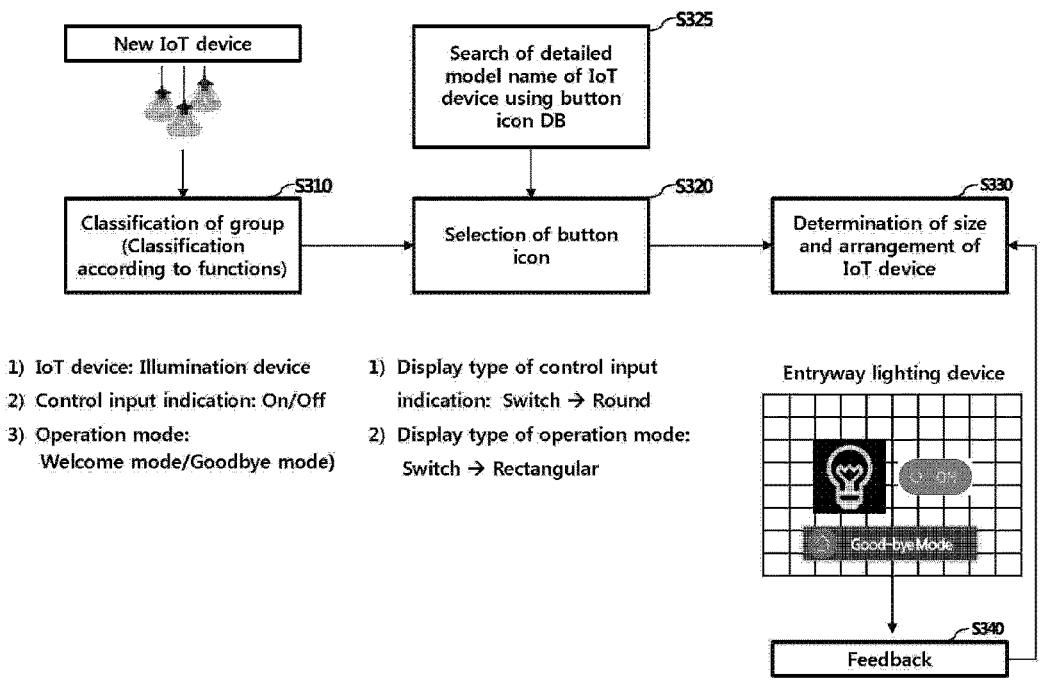
FIG. 3 is a flowchart illustrating a method of controlling a UI management server according to an embodiment of the present invention.

FIG. 3 is a flowchart illustrating a method of controlling a UI management server according to an embodiment of the present invention.

Referring to FIG. 3, the IoT management server may discover a new IoT device and perform an authentication and registration procedure of the IoT device. In the authentication and registration procedure, the IoT device may transmit ID information such as a model name thereof to the IoT management server. The IoT management server may transmit the ID information of the new IoT device to a UI management server.

The UI management server may classify the new IoT device into at least one group using the ID information such as the model name of the new IoT device (S310). The UI management server may classify the newly registered IoT device into a specific group using a classification table according to the model name. The classification table according to the model name may include a list of IoT devices which are classified into at least one group according to a function.

For example, the newly registered IoT device may be classified into an illuminance device group according to the model name received from the IoT management server.

Each of at least one group divided by the UI management server may have a control input indication or an operation mode (or state indication) which is different according to properties of a group.

For example, for the newly registered IoT device classified into the illumination device group, "on/off" may be designated as the control input indication and "welcome mode/goodbye mode" may be designated as the operation mode.

The UI management server may determine a button icon matching the IoT device classified into a group (S320).

Elements considered when the UI management server determines the button icon corresponding to the IoT device may include visibility, controllability, and a control range.

The UI management server may determine the shape and size of the button icon in consideration of visibility. For example, the UI management server may select a button icon having a shape and size similar to an actual shape of the IoT device to a certain degree.

The UI management server may determine the size of the button icon in consideration of the size of other button icons displayed on a display device of a vehicle. In other words, the UI management server may determine the size of the button icon of the newly added IoT device in consideration of the size of a general button icon.

The UI management server may determine the shape and size of the button icon in consideration of controllability. A user input scheme may differ according to the shape of the button icon. For example, if the IoT device is a device used for a predetermined time among 24 hours, a button icon of a circular type may be selected and, if an operation of the IoT device differs according to a situation in which numerical values (e.g., temperature) vary by the IoT device, a button icon having a graph of broken lines may be selected.

The UI management server may determine the shape and size of the button icon in consideration of a control range. For example, the shape of the button icon may depend on whether the IoT device is controlled discretely or in a multiplexing manner.

For example, the UI management server may select a button icon of a type in which two inputs are allowed with respect to an IoT device controlled discretely and select a button icon of a type in which multiple steps are displayed with respect to an IoT device performing a specific operation in a multiplexing manner.

The UI management server may search for a model name of the IoT device using a button icon DB (S325). The button icon DB may include detailed model names and function information corresponding to the detailed model names. The button icon DB may store various types of figures or shapes (e.g., a circular shape, a rectangular shape, a switch shape, a bulb shape, and a temperature shape) so as to search for a button icon matching the newly registered IoT device. The shapes stored by the button icon DB may be symbols having shapes similar to actual shapes of IoT devices to a certain degree. In other words, the button icon DB may store various shapes representing figures having similarity to IoT devices. Then, a user may intuitively recognize IoT devices through the shapes of button icons.

For example, the UI management server may analyze the newly registered IoT device as belonging to an illumination device group and as an entryway lighting device according to a detailed model name. Then, the UI management server may select a button icon of a switch type including a circular shape to some degree as a display type of a control input indication for turning on or off the entryway lighting device. The UI management server may select a bulb type having a similarity to the IoT device as a button icon. If it is analyzed that the entryway lighting device operates according to a preset mode, the UI management server may select a rectangular button switch as a display type of an operation mode.

After determining the button icon matching the IoT device, the UI management server may determine the size and arrangement of the button icon (S330). To this end, the UI management server may request that a vehicle which is to transmit UI configuration information transmit specification information about a display device. The UI management server may determine the size and arrangement of the button icon using the UI configuration information in consideration of the specification information about the display device from the vehicle.

A detailed method of determining the size and arrangement of the button icon will be described with reference to FIG. 4.

If the UI management server transmits the selected button icon and information about the size and arrangement of the button icon to the vehicle, the vehicle may output a UI on the display device according to information about the UI and provide the UI to a user.

The UI management server may receive information about the number of touches of the button icon from the vehicle during a preset period and change the size and arrangement of the button icon according to feedback for the received information (S340). In other words, if there are many touches for a specific button icon, the UI management server increases the size of the specific button icon to provide a more convenient UI to the user.

A method of changing the size and arrangement of a button icon according to the number of touches of the button icon by the user will be described in detail with reference to FIGS. 5A-5C, collectively referred to as FIG. 5.

Figure 4:
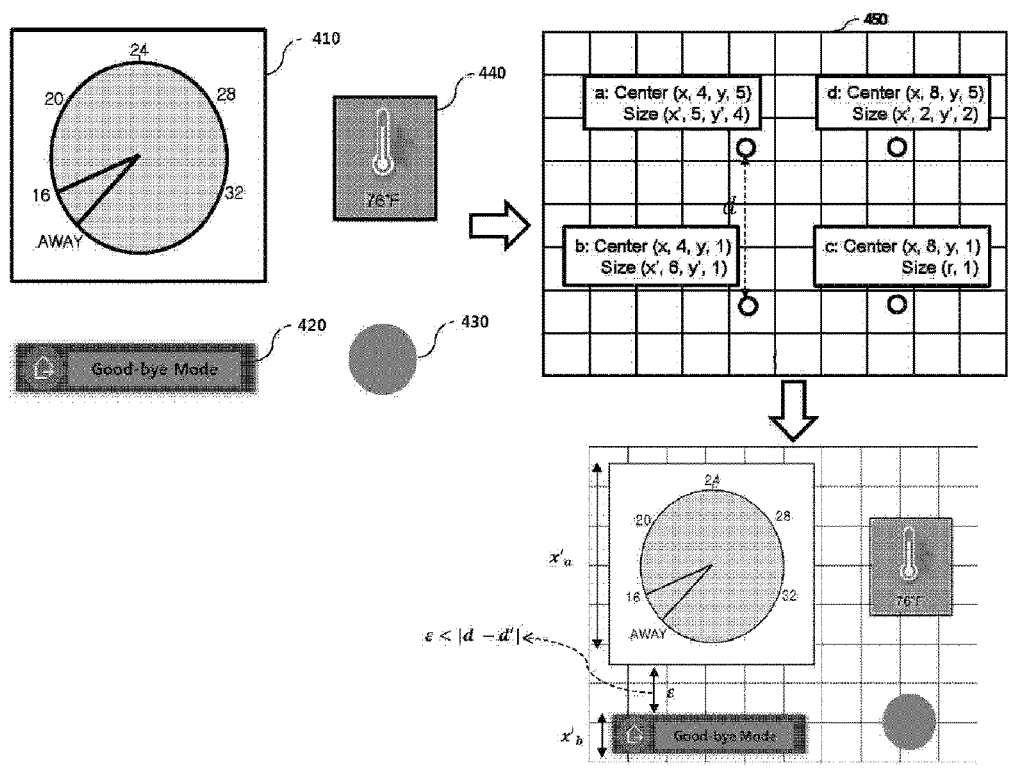
FIG. 4 is a view illustrating a method of determining sizes and arrangements of button icons selected by a UI management server according to an embodiment of the present invention.

FIG. 4 is a view illustrating a method of determining sizes and arrangements of button icons selected by a UI management server according to an embodiment of the present invention.

Referring to FIG. 4, the UI management server may determine size information and arrangement information of button icons according to the number of selected button icons or a frequency of use of each of the button icons.

The sizes and arrangements of a button icon a 410, a button icon b 420, a button icon c 430, and a button icon d 440 may be determined on a background screen 450 provided with guide lines of a grid type. Each of the selected button icons may have a basic set size.

The size and type of the background screen 450 may differ according to hardware specifications of a display device mounted in a vehicle. The UI management server may previously request that the vehicle which is to transmit UI configuration information transmit the hardware specification of the display device. In other words, the UI management server may determine the size of the background screen 450 according to the size of an output screen of the display device. According to an embodiment, an interval between the guide lines may differ according to the size of the output screen of the display device.

After selecting button icons corresponding to IoT devices using a button icon DB, the UI management server may split the background screen 430 according to the number of IoT devices registered to the IoT management server. For example, if the number of IoT devices registered to the IoT management server is 4, the UI management server may divide the background screen 430 into 4 regions, i.e., first to fourth regions.

The UI management server may determine a focus in each of the first to fourth regions. Basic focuses may be set according to the number of divided regions. A focus may be defined as a point at which the center of a button icon is located. If a specific location of the background screen 430 is a zero point, the focus may be expressed in a coordinate format. If the location of a button icon is changed, the coordinates of the focus may be changed.

In some embodiments, the UI management server may determine the focus in consideration of information about an initial set size of a button icon. That is, since the background screen may not be equally divided and may be unequally divided according to a basic set size of a button icon, the focus, which is the center of the unequally divided screen may be differently determined according to the information about the initial set size of the button icon.

For example, the coordinates of focuses of the button icon a 410 and the button icon b 420 may be $(x_a, y_a)$ and $(x_b, y_b)$, respectively. The sizes of the button icon a 410 and the button icon b 420 may be represented by the sizes of horizontal directions and the sizes of vertical directions of the button icon a 410 and the button icon b 420. That is, the size of the horizontal direction and the size of the vertical direction of the button icon a 410 may be represented as $x_a'$ and $y_a'$, respectively, and the size of the horizontal direction and the size of the vertical direction of the button icon b 420 may be represented as $x_b'$ and $y_b'$, respectively.

A distance d between the focuses of the button icon a 410 and the button icon b 420 may be calculated by Equation 1.

$$d=\sqrt{(x_b-x_a)^2+(y_b-y_a)^2} \quad \text{[Equation 1]}$$

To prevent the button icon a 410 and the button icon b 420 which are adjacent to each other from overlapping during display, a factor d' regarding the regions of the button icons may be calculated according to Equation 2.

$$d'=\sqrt{(a')+(b')^2} \quad \text{[Equation 2]}$$

In this case, a' and b' may be calculated by Equation 3 and Equation 4, respectively.

$$a' = \min\left\{\frac{x_b' + x_a'}{2}, x_b - x_a\right\} \quad \text{[Equation 3]}$$

$$b' = \min\left\{\frac{y_b' + y_a'}{2}, y_b - y_a\right\} \quad \text{[Equation 4]}$$

If the button icons have circular shapes, d' may be calculated by Equation 5.

When taking into consideration the focuses of the button icons and the sizes of the button icons, a' relates to a horizontal axis and b' relates to a vertical axis. The UI management server may adjust the adjacent button icons so as not to overlap, using the distance between the focuses of the adjacent button icons and an average of the sizes of the horizontal directions of the button icons and an average of the sizes of the vertical directions of the button icons.

$$d'=x_a'=y_a'=2r \quad \text{[Equation 5]}$$

The UI management server may adjust the arrangement of the button icons by comparing the distance d with d'. More specifically, if d>d', the UI management server may maintain the button icons and may calculate a distance between boundary lines of the adjacent button icons so that the distance between the boundary lines is above a minimum visible distance. In other words, the UI management server may change the locations of the adjacent button icons until |d−d'|>minimum visible distance.

When d<d', the UI management server may decrease the sizes of the adjacent button icons by a preset ratio until a condition of d>d' is satisfied. For example, when d<d', the UI management server may decrease the sizes of the adjacent button icons by 2%.

According to an embodiment, the UI management server may determine an output mode determined according to the number of button icons transmitted to a vehicle and transmit the output mode to the vehicle. The output mode may include a first mode indicating display of button icons and a second mode indicating display of the names of IoT devices as text.

For example, if the number of button icons displayed on a UI output from the vehicle is 8 or less, the button icons may be displayed. If the number of button icons exceeds 8, the UI may be output according to the output mode for displaying the names of IoT devices as text.

FIG. 5 is a view illustrating a method in which a UI management server changes sizes and arrangements of button icons in consideration of user feedback according to an embodiment of the present invention.

Referring to FIG. 5, a vehicle may count the number of touches performed by a user through at least one touch panel included in an input and output device. The touch panel creates numerous square grids on a screen so that a location of contact on a corresponding grid may be determined when a user contacts the grid. Accordingly, the vehicle may determine which item the user selects according to a location of a contact screen when the user touches a screen equipped with the touch panel.

According an embodiment, a display is divided into multiple regions and the number of touches in each divided region may be recorded.

Referring to FIGS. 5A and 5B, the number of touches on a screen during a predetermined time is recorded in square grids. The number of touches of each of a button icon b 520 and a button icon c 530 is larger than the number of touches of each of the other button icons.

While requesting that the UI management server change UI configuration information at every predetermined cycle, the vehicle may transmit information about the number of touches on a screen to the UI management server.

Referring to FIG. 5C, the UI management server may change a UI at every preset cycle in order to consider user feedback. The UI management server may increase the size of a button icon having relatively many touches, thereby providing great convenience to the user.

The UI management server may increase or decrease the sizes of the button icon b 520 and the button icon 530 by a predetermined ratio at every change cycle of the UI configuration information.

For example, if the number of touches of each of the button icon b 520 and the button icon c 530 is above a preset threshold value, the UI management server may increase the sizes of the button icon b 520 and the button icon c 530 by a preset ratio. Therefore, the locations of the button icon a 510 and the button icon d 540 may be changed in consideration of a distance between boundary values of adjacent button icons.

The UI management server may classify the number of touches during a predetermined time based on at least one reference value to determine whether to change the size of a button icon. For example, if a button icon is touched 6 or more times, the number of touches may be classified as "many touches". If a button icon is touched less than 6 times and more than 3 times, the number of touches may be classified as "normal touches". If a button icon is touched three or less 3 times, the number of touches may be classified as "few touches". The UI management server may increase the size of a button icon classified as "many touches". The UI management server may increase the size of a button icon classified as "normal touches" only when a space between adjacent button icons is permitted. The UI management server may not increase and may maintain the size of a button icon classified as "few touches".

The UI management server and the method of controlling the UI management server according to the present invention have the following effects.

First, a user in a vehicle can easily control IoT devices located in a household.

Second, a user can intuitively recognize button icons matching IoT devices while driving a vehicle.

Third, a UI that a user can easily use can be provided by increasing the sizes of frequently used button icons.

It will be appreciated by persons skilled in the art that that the effects that can be achieved through the present invention are not limited to what has been particularly described hereinabove and other advantages of the present invention will be more clearly understood from the above detailed description.

The method according to the above-described embodiment may be implemented as a computer-executable program that can be recorded in a computer-readable medium. Examples of the computer-readable medium include a read only memory (ROM), a random access memory (RAM), a compact disc (CD)-ROM, a magnetic tape, a floppy disk, an optical data storage, and a carrier wave (e.g., data transmission over the Internet).

The computer-readable recording medium can be distributed over a computer system connected to a network so that computer-readable code is written thereto and executed therefrom in a decentralized manner. Functional programs, code, and code segments needed to realize the above-described method can be easily derived by programmers skilled in the art.

Those skilled in the art will appreciate that the present invention may be embodied in other specific forms than those set forth herein without departing from the spirit and essential characteristics of the present invention.

The above detailed description is therefore to be construed in all aspects as illustrative and not restrictive. The scope of the invention should be determined by reasonable interpretation of the appended claims and all changes coming within the equivalency range of the invention are within the scope of the invention.

What is claimed is:

1. A method of controlling a user interface (UI) management server, comprising:
   receiving registration information of an Internet of Things (IoT) device from an IoT management server for collecting information regarding the IoT device;
   classifying the IoT device into at least one group using the registration information;
   determining a plurality of button icons matching the IoT device according to property information of the classified at least one group;
   calculating size information and arrangement information of the plurality of button icons based on the number of the plurality of button icons and a frequency of use each button icon of the plurality of button icons;
   transmitting the determined plurality of button icons, the calculated size information, and the calculated arrangement information to a designated vehicle for display; and
   determining what is to be displayed on the display of the designated vehicle based on the number of the plurality of button icons so that, when the number of the button icons is less than or equal to a predetermined value, the designated vehicle displays the plurality of button icons according to the calculated size information and the arrangement information of the number of the plurality of button icons, and when the number of the plurality of button icons is greater than the predetermined value, the designated vehicle displays only a name of the IoT device as text without displaying the button icons.

2. The method of claim 1, wherein the button icons include a control input indication and an operation mode of the IoT device.

3. The method of claim 1, further comprising:
   receiving a number of touches corresponding to each of the button icons from the designated vehicle;
   changing the size information or the arrangement information based on the number of touches; and
   transmitting the changed size information or the changed arrangement information to the designated vehicle.

4. The method of claim 1, wherein determining the button icons comprises determining button icons including a control input indication or an operation mode, for receiving different operation modes of the IoT device according to the group.

5. The method of claim 1, wherein transmitting the determined plurality of button icons, the calculated size information, and the calculated arrangement information to the designated vehicle comprises:
   splitting a background screen on which the button icons are located into regions in consideration of the number of the button icons;
   determining a focus of each of the regions of the background screen; and
   determining an interval of adjacent button icons using a distance between focuses of the adjacent button icons and sizes of the button icons.

6. The method of claim 5, further comprising determining the focus in consideration of initial set size information of the button icons, wherein the focus is a coordinate on a divided background screen at which center of a button icon is located.

7. The method of claim 5, further comprising:
   calculating a distance between boundary lines of the adjacent button icons; and
   changing the locations of the adjacent button icons until the distance between boundary lines is above a minimum visible distance.

8. The method of claim 7, further comprising increasing sizes of the button icons by a second ratio when the number of touches of each of the button icons is above a threshold value during a preset time.

9. A non-transitory computer-readable recording medium in which a program for performing the method of claim 1 is stored.

10. A user interface (UI) management server, comprising a server comprising a non-transitory computer-readable medium, a communication unit and a controller to
   receive registration information of an Internet of Things (IoT) device from an IoT management server so as to be able to collect information regarding the IoT device
   classify the IoT device into at least one group using the registration information;
   determine a plurality of different button icons matching the IoT device according to property information of the classified at least one group;
   calculate size information and arrangement information of the plurality of button icons based on the number of the plurality of button icons and a frequency of use of each of button icon of the plurality of button icons;
   transmit the determined plurality of button icons, the calculated size information, and the calculated arrangement information to a designated vehicle for display; and
   determine what is to be displayed on the display of the designated vehicle based on the number of the plurality of button icons so that, when the number of the button icons is less than or equal to a predetermined value, the designated vehicle displays the plurality of button icons according to the calculated size information and the arrangement information of the number of the plurality of button icons, and when the number of the plurality of button icons is greater than the predetermined value, the designated vehicle displays only a name of the IoT device as text without displaying the button icons.

11. The UI management server of claim 10, wherein the button icons include a control input indication and an operation mode of the IoT device.

12. The UI management server of claim 10, wherein the communication unit is configured to receive the number of touches of each of the button icons from the designated vehicle and wherein the controller is configured to change the size information or the arrangement information using the number of touches and to transmit the changed size information or the changed arrangement information to the designated vehicle.

13. The UI management server of claim 10, wherein the controller is configured to determine button icons including a control input indication or an operation mode for receiving different operation modes of the IoT device according to the group.

14. The UI management server of claim 10, wherein the controller is configured to split a background screen on which the button icons are located into regions in consideration of the number of the button icons;

determine a focus of each of the regions of the background screen; and determine an interval of adjacent button icons using a distance between focuses of the adjacent button icons and sizes of the button icons.

15. The UI management server of claim 14, wherein the controller is configured to determine the focus in consideration of initial set size information of the button icons, wherein the focus is a coordinate on a divided background screen at which center of a button icon is located.

16. The UI management server of claim 14, wherein the controller is configured to calculate a distance between boundary lines of the adjacent button icons, and to change the locations of the adjacent button icons until the distance between boundary lines is above a minimum visible distance.

17. The UI management server of claim 10, wherein the controller is configured to increase sizes of the button icons by a second ratio when the number of touches of each of the button icons is above a threshold value during a preset time.

* * * * *

UNITED STATES PATENT AND TRADEMARK OFFICE
CERTIFICATE OF CORRECTION

PATENT NO. : 10,503,355 B2
APPLICATION NO. : 15/966528
DATED : December 10, 2019
INVENTOR(S) : Joon Young Kim et al.

Page 1 of 1

It is certified that error appears in the above-identified patent and that said Letters Patent is hereby corrected as shown below:

On the Title Page

Item (73) Assignees, Line 2, delete "Kia Motors Company" and insert --Kia Motors Corporation--.

In the Claims

In Column 13, Line 51, Claim 1, delete "a fequency of use each" and insert --a frequency of use of each--.

Signed and Sealed this
Fifth Day of May, 2020

Andrei Iancu
*Director of the United States Patent and Trademark Office*